Patented Dec. 24, 1940

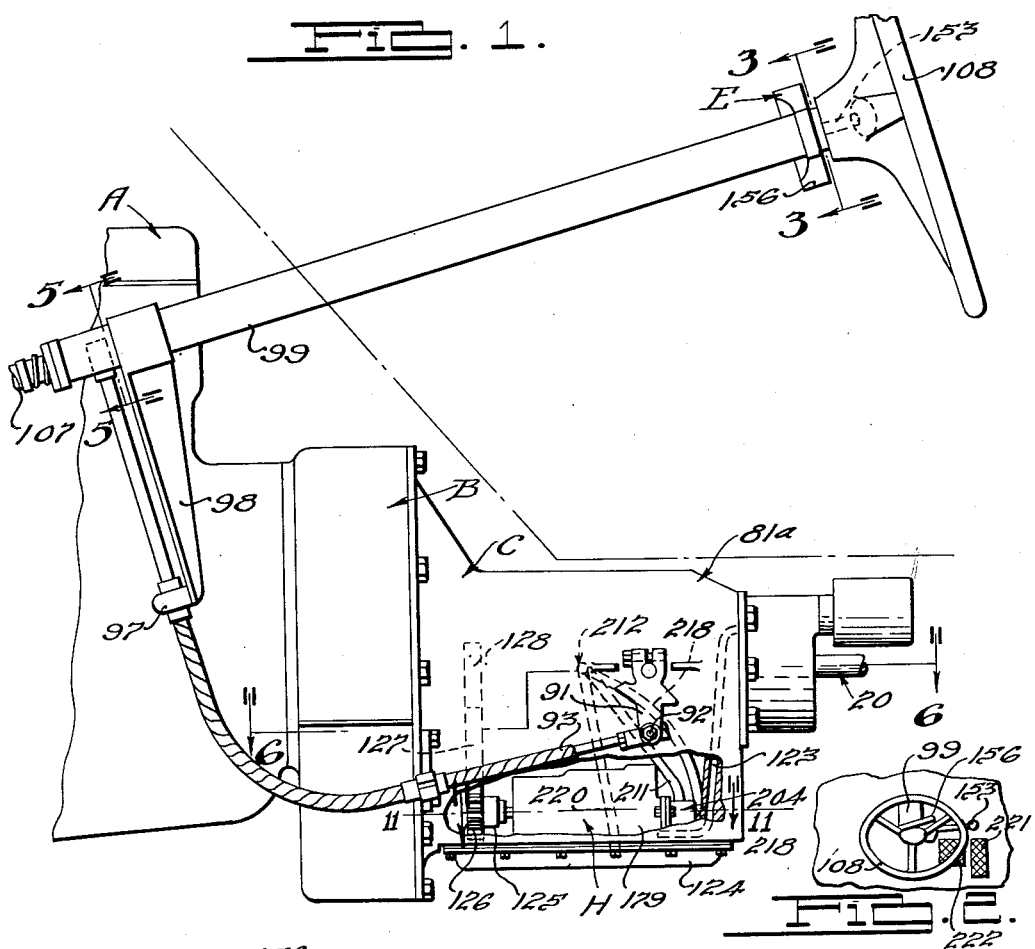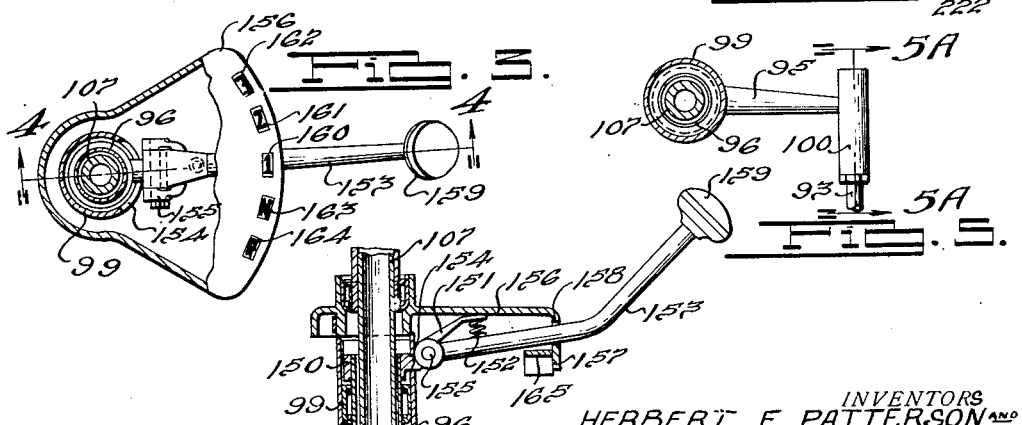

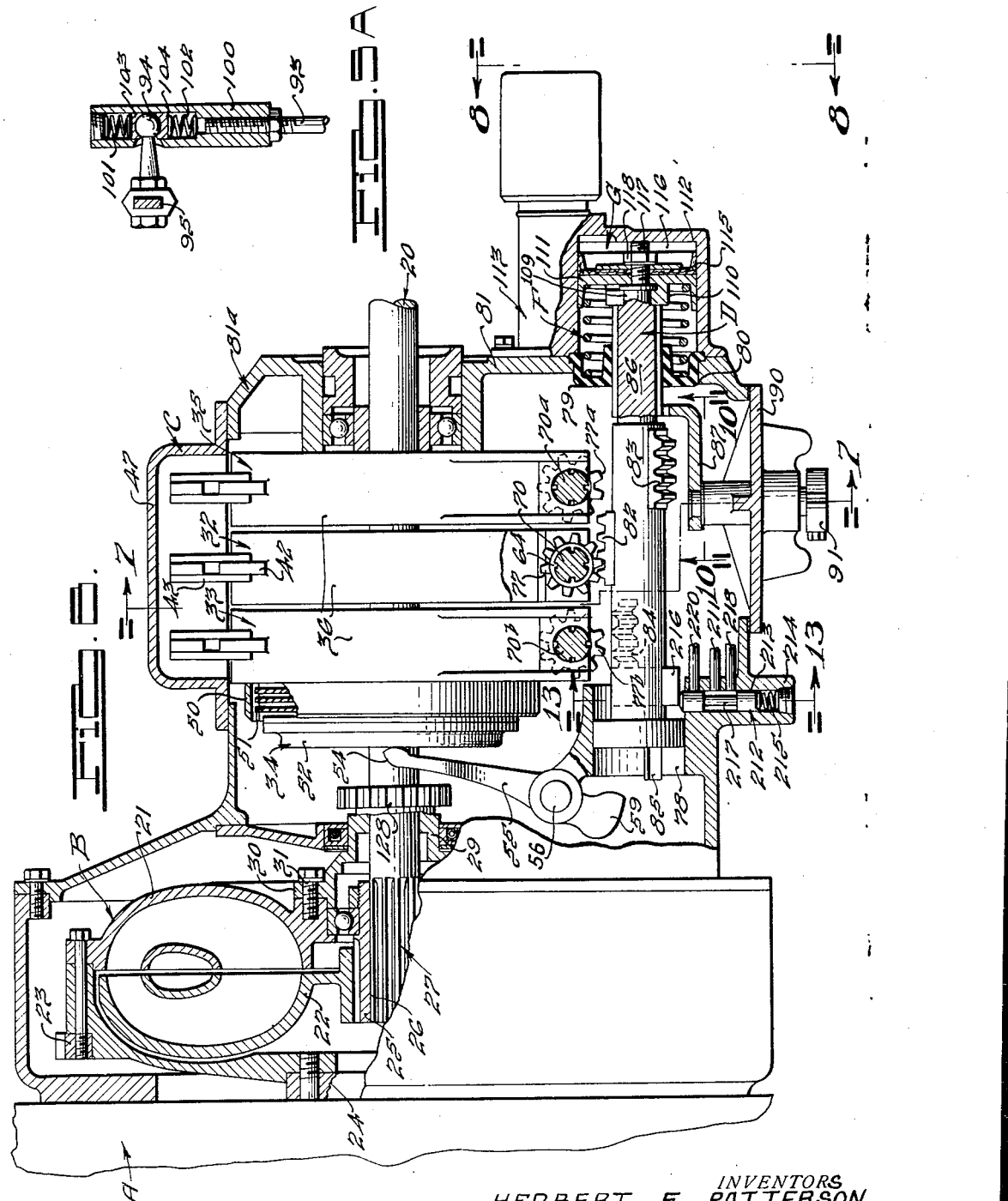

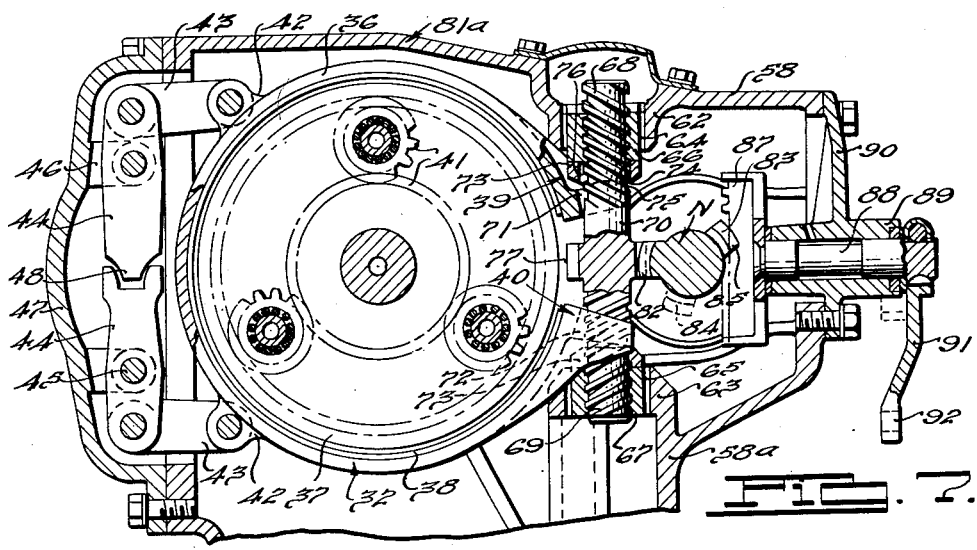
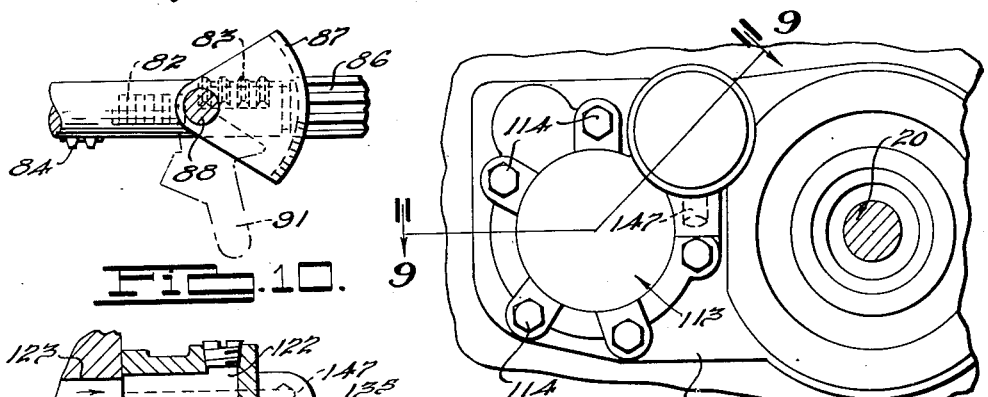
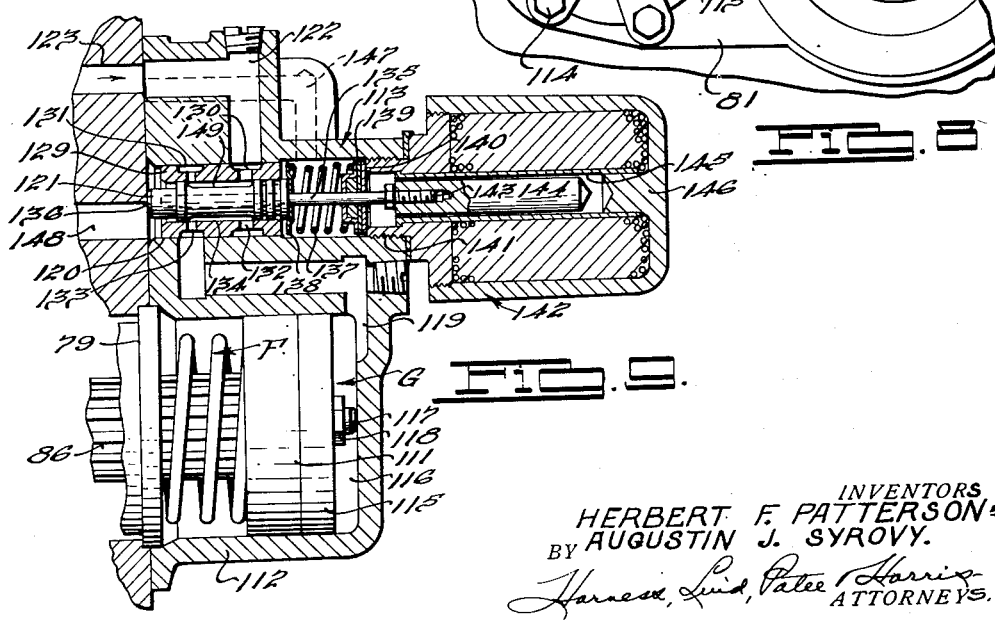

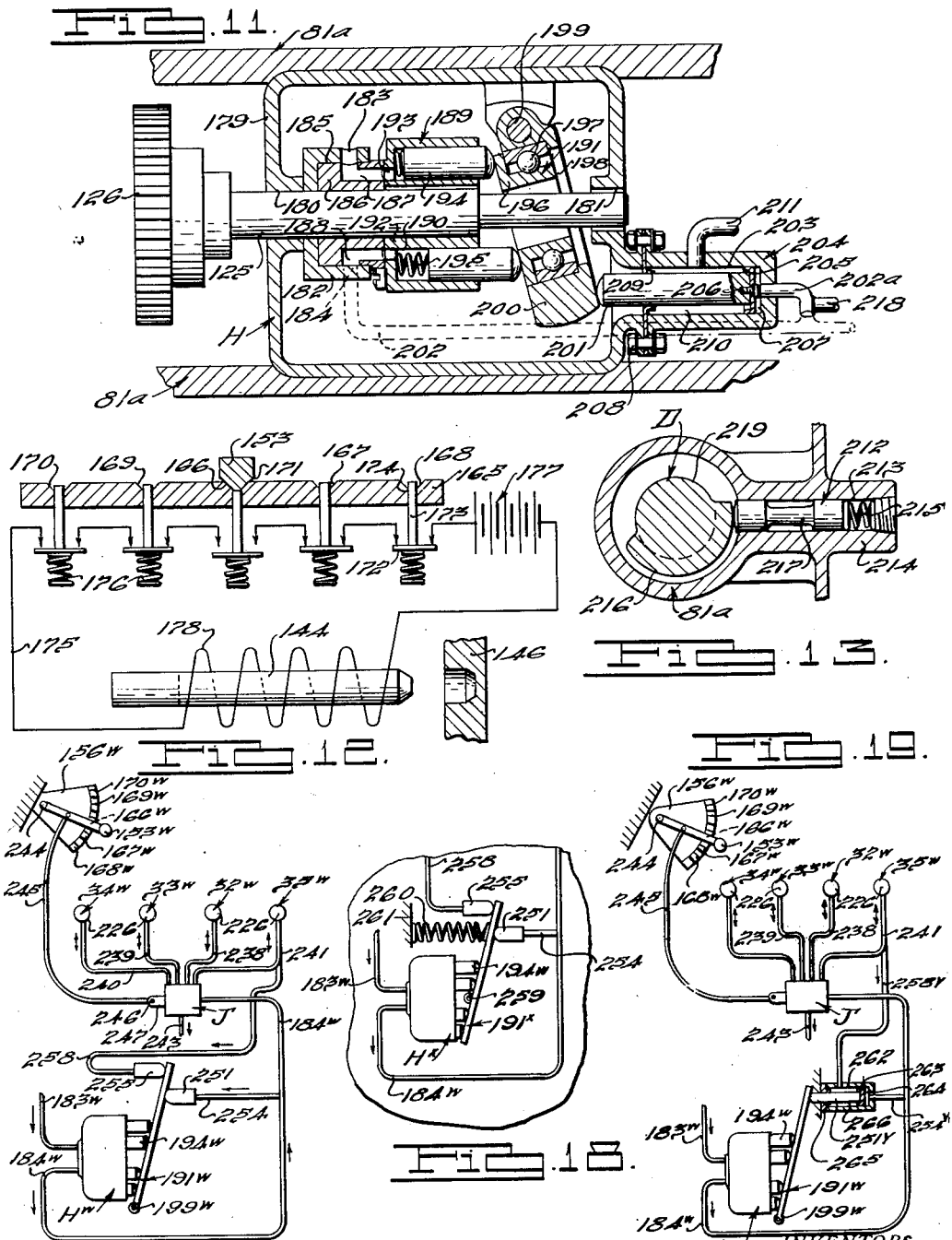

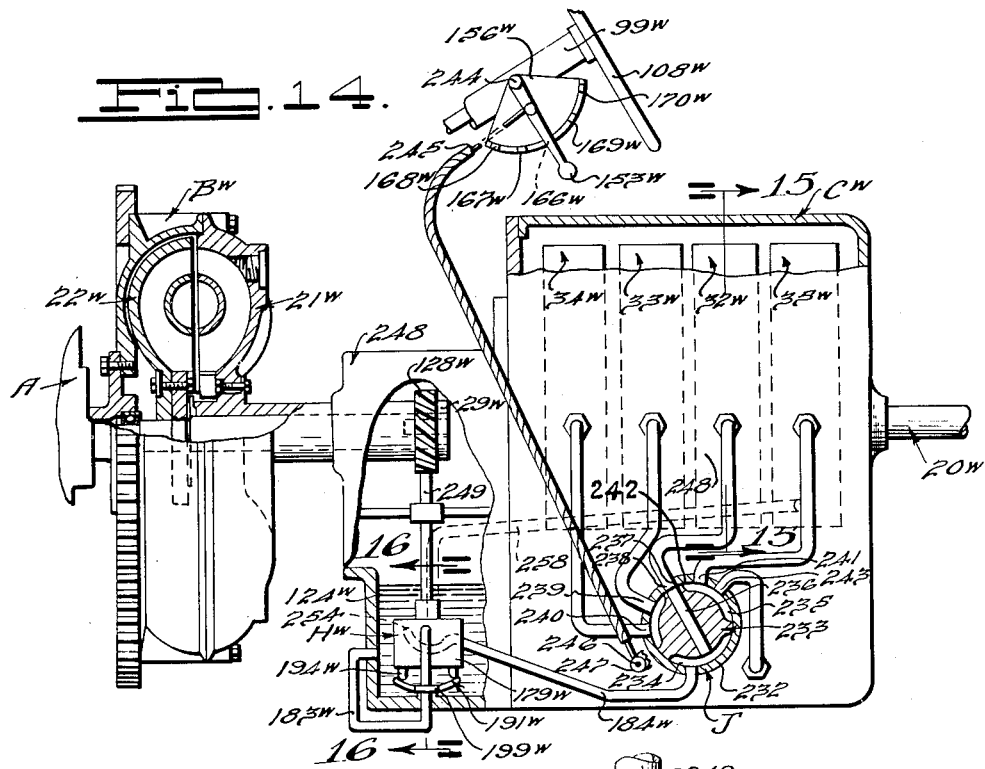
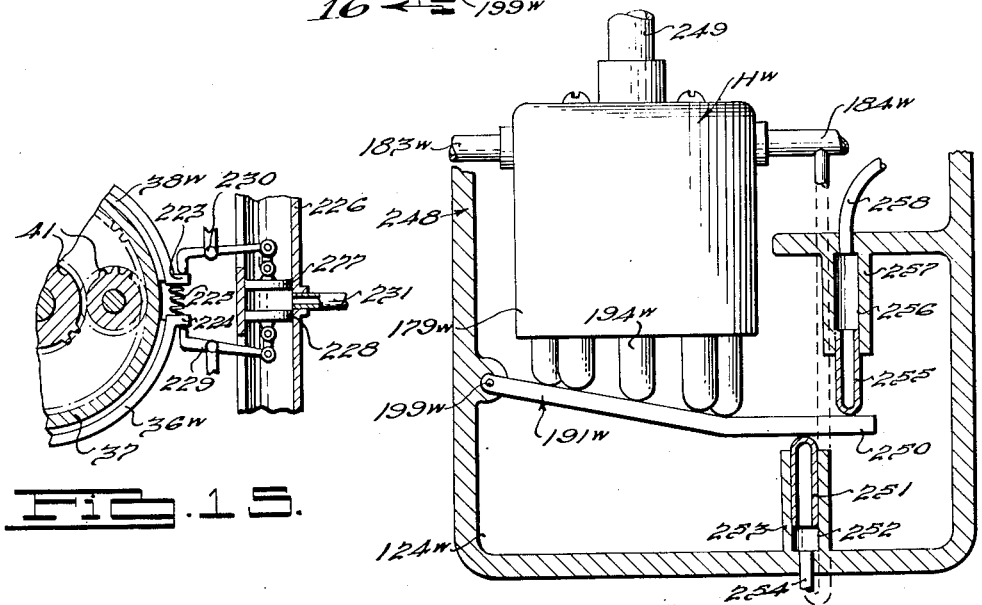

2,226,014

UNITED STATES PATENT OFFICE 2,226,014

POWER TRANSMISSION

Herbert F. Patterson, St. Clair Shores, and Augustin J. Syrovy, Detroit, Mich., assignors to Chrysler Corporation, Highland Park, Mich., a corporation of Delaware Application November 26, 1937, Serial No. 176,588

17 Claims. (Cl. 74—262)

Our invention relates to power transmission mechanism and refers more particularly to improvements in power transmission systems especially adapted for use in connection with motor vehicles, although not necessarily limited thereto.

The invention, in certain more limited aspects, provides improvements in the drive and control for power transmission systems having epicyclic or planetary gear trains. With such planetary transmissions, it is customary to arrange the gearing to provide for the desired number of speed ratios between the engine and the vehicle driving ground wheels and such gearing is customarily selected and controlled to obtain the desired driving speed ratio by actuating of any one of a group of transmission controlling devices usually consisting of reaction brake bands associated with and controlling the rotation of corresponding drums or similar elements of the various gear trains.

It is an object of our invention to provide a novel and inexpensive means for effecting, in response to the selection of a speed ratio, the desired degree of engagement of the selected speed ratio controlling device of the transmission.

A further object of our invention, in certain more limited aspects, resides in the provision of a pump pressure regulating means which effects the desired fluid pressure for actuating the pressure operating means to properly control the brake bands and clutches of the planetary gear trains or other corresponding types of transmissions in response to the selection of a speed ratio controlling device of the transmission. In the broader aspects of our invention, the fluid pressure is preferably provided by a suitable liquid medium such as oil, but the fluid pressure medium may be air under pressure greater or less than atmospheric pressure.

A still further object of our invention is to provide a simple and efficient means for regulating the well-known swash-plate pump—of such type as is described and claimed in the co-pending application of Augustin J. Syrovy, Serial No. 29,788, filed July 5, 1935—in order to provide, in response to the selection of a transmission speed ratio, the proper maximum fluid pressure to effect the degree of engagement of the selected transmission speed ratio controlling device necessary to control the torque transmitted by the selected speed ratio.

Another object of our invention resides in the provision of a novel differential balancing piston which regulates the well-known swash-plate pump, in response to the selection of a transmission speed ratio, to effect the fluid pressure necessary for the operation of the selected speed ratio controlling device to control the torque transmitted by the selected speed ratio.

An additional object of our invention resides in the provision of a pressure regulating means including a fluid pressure element controllably acting on the swash-plate of the well-known swash-plate pump to effect, in response to the selection of one of the transmission speed ratios, the fluid pressure necessary for the operation of the selected speed ratio controlling device in completely controlling the torque transmitted by the selected speed ratio.

Another object of our invention, in certain more limited aspects, is to provide a pressure regulating means, including a novel fluid pressure element controlled swash-plate for the well-known swash-plate pump that improves the operating and levelling off characteristics of the pump, for effecting in response to the selection of one of the transmission speed ratios the fluid pressure necessary for the operation of the selected speed ratio controlling device in completely controlling the torque transmitted by the selected speed ratio.

Further objects and advantages of our invention will be apparent from the following detail descriptions of several illustrative embodiments of the principles of our invention, reference being had to the accompanying drawings in which:

Fig. 1 is a side elevational view, somewhat diagrammatic in form, illustrating our power transmission mechanism as a whole.

Fig. 2 is a detail elevational view showing the manually controlled selector element and the well-known foot-operated brake and accelerator pedals of a motor vehicle.

Fig. 3 is a sectional view of the manually controlled selecting mechanism taken as indicated by the line 3—3 of Fig. 1.

Fig. 4 is a sectional view along the line 4—4 of Fig. 3.

Fig. 5 is an enlarged sectional view taken approximately as indicated by the line 5—5 of Fig. 1.

Fig. 5A is an enlarged detail sectional view taken along the line 5A—5A of Fig. 5.

Fig. 6 is an enlarged sectional view taken along line 6—6 of Fig. 1 through the transmission and fluid clutch.

Fig. 7 is a vertical sectional view through the transmission, illustrating one of the speed ratio controlling devices and parts associated therewith, the section being taken as indicated by the line 7—7 of Fig. 6.

Fig. 8 is a vertical elevational view illustrating the housing mechanism for the fluid pressure operator and associated control valve, the view being taken approximately as indicated by the line 8—8 of Fig. 6.

Fig. 9 is a detail sectional view taken along the line 9—9 of Fig. 8.

Fig. 10 is a detail vertical sectional view taken approximately as indicated by the line 10—10 of Fig. 6.

Fig. 11 is a detail sectional view of the transmission pump and a portion of our pressure regulating means therefor, the section being taken as indicated by the line 11—11 of Fig. 1.

Fig. 12 is a diagrammatic view illustrating the electrical system of control between the manually operated selector element and the fluid pressure control valve mechanism.

Fig. 13 is an enlarged detail sectional view taken approximately as indicated by the line 13—13 of Fig. 6.

Fig. 14 is a side elevational view corresponding to Fig. 1 but illustrating another embodiment of our variable regulating means.

Fig. 15 is a fragmentary vertical sectional view somewhat diagrammatic and illustrating one of the planetary transmission speed ratio brake controlling devices, the section being taken along the line 15—15 of Fig. 14.

Fig. 16 is a detail sectional elevational view of the pressure pump and a portion of our pressure regulating means, the section being taken approximately as indicated by the line 16—16 of Fig. 14.

Fig. 17 is a diagrammatic view illustrating the Figs. 14 to 16 fluid pressure system between the manually operated selector element and the operating means for the speed ratio controlling devices.

Fig. 18 is a partial diagrammatic view corresponding to Fig. 17 but illustrating another embodiment of our pressure regulating means.

Fig. 19 is a diagrammatic view which corresponds to Fig. 17 but illustrates still another embodiment of our pressure regulating means.

Referring now to the drawings, we have illustrated our invention in connection with a motor vehicle drive, this drive including a prime mover or engine A, a portion of which is shown in Fig. 1, a main clutch B driven from the engine, and a change speed transmission or gear box C driven from the clutch B. The drive passes from the transmission through the power take-off shaft 20, which, as usual, may extend rearwardly of the vehicle to drive the usual ground wheels (not shown).

The clutch B may be of any suitable construction for controlling the drive between engine A and transmission C, this clutch being illustrated in Fig. 6 in the form of a fluid coupling type having the usual driving and driven cooperating vane members 21 and 22 respectvely. The driving vane member 21 is carried by the engine flywheel 23, the latter being connected as usual with the rear end of the engine crankshaft 24. The driven vane member 22 is splined to a hub 25 which in turn is splined at 26 on the forward end of the driven shaft 27. This driven shaft extends rearwardly to drive the power take-off shaft 20 through the intermediary of the various gear trains of transmission C.

Where the power means for operating the transmission is afforded by a fluid such as oil under pressure, the pump for placing the oil under pressure is preferably operated from the engine to maintain the fluid pressure even when the pump is idling. It is therefore preferred to provide a pump drive from the driving clutch member 21 rather than the driven clutch member 22 inasmuch as the latter may be stationary under certain conditions of vehicle operation such as when the vehicle is standing still with the engine idling.

This pump drive may be provided by reason of a driving sleeve or hollow shaft 29 mounted on the shaft 27 but rotatable independently thereof. The sleeve 29 has a hub or flange 30 connected at 31 with the driving vane member 21 of the clutch B so that even when the driven vane member 22 is not being operated from the driving vane member 21, the sleeve 29 will be rotatably driven from the engine crankshaft 24 and flywheel 23. The pump drive from sleeve 29 will be more apparent hereinafter.

We have illustrated the fluid type of clutch B since a clutch of this character has a number of advantages in connection with a transmission of the planetary gear type C and in further connection with our arrangement of vehicle driving controls which will be presently described more in detail. Among the advantages of the fluid type of clutch are the provision of a smooth drive for the vehicle through the planetary transmission, relatively high power driving efficiency, automatic release of the drive between the engine and transmission when the engine is idling, and with the transmission manipulated to establish one of its driving gear ratio settings, and other well known favorable characteristics. We desire to point out, however, that other types of clutches may be employed to control the drive between engine A and transmission C within the broader aspects of our invention. For example, the well known type of friction clutch may be employed and manually operated or automatically operated by the well known commercial type of vacuum clutch releasing mechanism as will be readily understood.

We have illustrated the change speed transmission C as the epicylic or planetary type, this general form of transmission being well known in the art and, as usual, includes a plurality of transmission speed ratio controlling clutches or brakes 32, 33, 34 and 35, these braking controlling devices being respectively adapted to actuate the transmission in its first speed ratio or low gear, second speed ratio or intermediate gear, third speed ratio or direct drive, and reverse drive. Other speeds may be provided as desired.

The typical brake device 32 illustrated in Fig. 7 consists of an outer band 36 which substantially surrounds the rotary element or drum 37, the band being provided with friction braking material 38 carried by the band and adapted for frictional engagement with the drum 37. The band 36 has its ends formed with laterally projecting actuating flanges 39 and 40 positioned adjacent each other, means being provided to move the band ends toward each other to contract the band 36 for causing the friction material 38 to brake rotary drum 37, the band having sufficient inherent resilience to expand away from contact with the drum when the actuating means is relieved at the flanged ends 39 and 40. In Fig. 7 the low speed ratio braking device 32 is illustrated in its inoperative position whereby the drum 37 is free to rotate through operation of the planetary gear set 41 somewhat diagrammatically illustrated in association with the drum 37. When the braking device 32 is actuated by contracting the band 36, the drum 37 is held against rotation, the driven shaft 20 in such instance being operated through the planetary gearing 41 to provide the low speed drive for the motor vehicle.

In order to anchor the band 36 and to substantially equalize the braking forces applied to drum 37 around the periphery thereof and thereby substantially avoid a tendency toward lateral loading of the drum and planetary gearing transverse to the axis of the drum, we have provided the band with a circumferentially spaced pair of anchoring flanges 42. These flanges are connected through links 43 with the levers 44 pivotally mounted at 45 with the supporting bracket 46 of the transmission side cover casing 47, the levers 44 being interlocked at 48 so that movement of one of the flanges 42 will be transmitted through the pivotal levers 44 and the links 43 to the other portion of the band associated with the anchoring device. The links 43 are thus pivotally connected at their opposite ends respectively with the anchors 42 and levers 44.

The third speed clutching controlling device 34 is arranged for a direct drive through the transmission and differs somewhat from the braking devices 23, 33 and 35 in that the controlling device 34 has its rotary controlling element 50 adapted for clutching action in a well known manner by frictional engagement through the discs 51 by an axially movable clutching member 52. The latter clutching member is thus engaged by the yoked end 54 of an actuating lever 55 pivotally mounted by a pin 56 suitably supported in the transmission casing. On the opposite side of pivot 56 the lever 55 is provided with a step actuating portion 59, the purpose of which will presently be more apparent.

The transmission casing portions 58 and 58ª are respectively provided with the vertically spaced inwardly extending supporting brackets 62 and 63, respectively, these brackets being formed with coaxial splined openings 64 and 65, respectively. Splined within these openings are the nuts 66 and 67 which are axially and oppositely threaded to receive the correspondingly threaded ends 68 and 69 of an operating oscillatory shaft or screw 70.

The shaft 70 extends through openings 71 and 72, respectively, formed to open laterally in the aforesaid band ends 39 and 40, these openings having considerable clearance with shaft 70 so as not to bind on the shaft when the band is contracted and expanded. In order to transmit the thrust of the nuts 66 and 67 to the flanges 39 and 40 so as to relieve distorting loads on the shaft 70 and parts associated therewith, each nut operates a sleeve 73 having a curved face 74 engaging a curved face 75 of band end 39 or 40. The engaged curved faces 74 and 75 provide a rocking freedom of action, each sleeve 73 having a clearance indicated at 76 with the shaft 70.

The operating shaft 70 of the low speed braking device 32 has its portion thereof intermediate the band ends 39 and 40 formed with a gear 77, the means for oscillating shaft 70 through the gear 77 being hereinafter more particularly described.

In the operation of the low speed controlling device 32 as thus far described, it will be apparent that when the shaft 70 is given a rotary movement, such movement operates through the oppositely threaded ends 68 and 69 of the shaft 70 to cause the nuts 66 and 67 to move inwardly toward each other in their splined openings 64 and 65 respectively, this movement acting through the sleeves 73 to contract the band ends 39 and 40 whereby the low speed drum 37 has its rotation checked for establishing the low speed drive through the transmission. When the shaft 70 is rotated in the opposite direction, the nuts 66 and 67 are moved away from each other and the band 36 is expanded to permit the drum 37 to again rotate and thereby relieve the drive through the transmission controlling device 32.

In order to avoid repetition we have not illustrated all of the details of the brake operated means associated with the controlling devices 33 and 35, it being understood that such operating means are similar to that described in connection with the controlling device 32. For convenience of reference the operating shaft or screw for the reverse speed braking device is designated as 70ª and the corresponding shaft for the second speed braking device 33 is designated as 70ᵇ. The gears associated with these screw shafts are respectively designated as 77ª and 77ᵇ. As will be more apparent presently, the gears 77, 77ª and 77ᵇ and lever end 59 are adapted to be selectively operated in order to selectively control the engagement and release of the respective speed ratio controlling devices 32, 35, 33 and 34.

The transmission casing is adapted to support in a forward opening 78 the reciprocating and oscillating rack or actuating shaft D. The rear bearing for shaft D is provided by a member 79 which is disposed in a suitable opening 80 in the rear end wall 81 of the transmission casing 81ª, the rear end of the actuating shaft D being also supported by a piston for reciprocating the shaft and which will presently be referred to in detail.

This actuating shaft D has a series of teeth forming a rack adapted to be brought into operative association with each of the screw gears, these racks being designated at 82, 83 and 84 for respectively operating the screw gears 77, 77ª, and 77ᵇ. The forward end of shaft D is further provided with a third speed actuating projection 85 adapted for engagement with the lever shoulder 59 for operating the third speed controlling device 34. It will be noted that the racks and projection 85 are longitudinally spaced along the shaft D and that they are also spaced circumferentially of the shaft whereby upon progressive rotation of the shaft only one of the racks and the projection 85 will engage its associated screw gear or lever 55 at any time.

In Figs. 6 and 7 it will be noted that the shaft D is positioned so that the low speed rack 82 is in position for operating the low speed gear 77 and when the shaft D is moved forwardly or to the left as viewed in Fig. 6, the low speed screw 70 will be rotated to cause the aforesaid braking operation of the low speed controlling device 32 for establishing the low speed drive through the transmission. It will furthermore be noted that with the low speed rack 82 in the position illustrated, the remaining racks 73, 84 as well as projection 85 are free from engagement with their respective associated gears 77ª, 77ᵇ, and the lever 55. From Figs. 6 and 7 it will be noted that the shaft D has a space longitudinally and circumferentially between the second speed rack 84 and the direct drive projection 85, this space being designated as the neutral space "N" so that when the shaft is positioned with this space facing the screw gears, each of the racks as well as projection 85 will be free from contact with their associated screw gears and lever 55, and the transmission will be in neutral at which time the various braking devices 32, 33, 34 and 35 are released.

In order to selectively rotate the rack D for selectively engaging the racks and projection 85 thereof with the respective screw gears and lever 55, and also for axially operating the shaft in the various positions of selective adjustment, the following mechanism is provided.

Rearwardly adjacent the reverse rack 83, the shaft D is provided with a circular rack or gear 86 meshing with a segmental rack 87 rotatably fixed with a shaft 88, best shown in Fig. 7, this shaft being rotatably journaled by a bearing 89 carried by the transmission side cover 90. The shaft 88 has fixed thereto, outwardly of the transmission cover, a lever 91 connected at 92 (see Fig. 1) to a Bowden wire operating mechanism 93.

The Bowden wire operating mechanism 93 extends forwardly for pivotal connection with a ball end 94 of a lever assembly 95 secured to a tubular shaft 96 as shown in Figs. 5 and 5A. The forward end of the Bowden mechanism has a guide 97, provided by the bracket 98 rigidly secured to the outer stationary tubular housing 99 comprising the steering post, as best shown in Fig. 1. A yielding connection is preferably provided at some convenient point between the manual selector element, which will be shortly described, and the segmental rack 87 for rotatably adjusting the shaft D. We have illustrated this yielding connection in Fig. 5A intermediate the lever ball end 94 and the forward end of the Bowden wire mechanism 93. The wire 93 is anchored at its forward end to a housing 100 provided with preloaded oppositely acting springs 101 and 102 which respectively act against the ball seats 103 and 104. The springs 101 and 102 have sufficient rigidity so that normally they provide a rigid connection between lever 95 and Bowden wire 93. However, if for any reason the manually operated adjusting mechanism for the shaft D should bind at any point, the mechanism will be protected during any manual adjustment of lever 95 under such conditions by reason of the ability of springs 101 and 102 to yield. This yielding connection is therefore in the nature of a safety device for the manually controlled selector operating mechanism. The hollow operating shaft 96 extends within the housing 99 and is suitably rotatably journaled therein.

Rotatable within the hollow shaft 96 is the hollow steering shaft 107 operably connected at its upper end to a steering wheel 108 and adapted for operable connection at its lower end to the usual steering mechanism for the front ground wheels of the motor vehicle (not shown). The hollow operating shaft 96 extends upwardly to the point preferably just below the steering wheel 108 to the manually controlled device generally designated at E for selectively controlling or manipulating the transmission speed ratios as will be presently more apparent.

Returning now to Fig. 6, the selector rack shaft D has its rear end adjacent the circular rack 86 provided with a groove 109 adapted to receive the flange 110 of the fluid pressure operating piston assembly 111 adapted for reciprocal movement in the cylinder 112 which is a part of a casting 113 best illustrated in Figs. 8 and 9 as attached at 114 to the rear wall of the transmission. The piston 111 provides the actuating member of the power operating means G for moving shaft D under power to engage the various brake bands and the direct speed clutch 34.

For yieldingly urging the rack shaft D to the right or rearwardly to release the speed ratio controlling devices, we have provided prime mover means F preferably in the form of a compression coil spring surrounding the rear end portion of shaft D between the fixed abutment provided for the bearing member 79 and acting on piston 111. In Fig. 6 it will be noted that the bearing member 79 is conveniently held in position by clamping the same between the rear casing wall 81 of the transmission and the casting assembly 113.

The piston 111 has a flexible sealing cup 115 adapted to seal the piston against escape of the fluid forwardly of the cylinder 112, the cup 115 bearing against the walls of the cylinder under the action of the fluid pressure introduced to the pressure chamber 116. The sealing cup is held in place by the rearwardly extending threaded reduced fastener or nut 118. Fluid, such as oil under pressure, is introduced to the pressure chamber 116 as best shown in Fig. 9, through a passage 119 leading to the valve controlled chamber or cylinder 120 which slidably receives the fluid pressure supply controlling valve 121.

The cylinder 120 is supplied with oil under pressure through a passage 122 which receives the oil by a conduit 123 formed in the transmission casing casting. The conduit 123, as best shown in Fig. 1, leads to the delivery side of a swash-plate type pump H driven from its location in the oil storing sump or reservoir 124 of the transmission casing by reason of the shaft 125 provided at its forward end by a driving gear 126. This gear meshes with an idler gear 127 which in turn meshes with the driving pinion 128 (see Fig. 6) carried on the rear end of the driving sleeve 29 which, as aforesaid, is fixed to the fluid impeller 21.

A valve guide porting member 129 is pressed into the cylinder 120 so as to be fixed therewith, this porting member having annular conduits 130 and 131, respectively, communicating with the passages 122 and 119. The annular passages 130 and 131 are also respectively provided with the inwardly extending ports 132 and 133 adapted for control by the valve 121. This valve has a sliding fit within the cylindrical bore 134 of the porting member 129 and extending axially through the valve with sufficient clearance to prevent binding thereof, is a valve operating rod 135 preferably of brass or other non-magnetic material. The rod 135 extends forwardly of valve 121 and is provided with a stop 136 adapted to limit forward movement of valve 121 under the influence of a spring 137 which operates between a valve spring abutment 138 and a rear fixed abutment 139, the latter having associated therewith the fluid pressure sealing washers 140 acting against the threaded stem 141 of the electrical solenoid 142.

The rear end of valve operating rod 135 is connected at 143 with the armature 144 of solenoid 142, the armature being adapted for reciprocation in the solenoid cylinder 145 having the rear abutment 146. Any fluid which may leak rearwardly beyond the valve 121 is adapted to drain downwardly from the portion of casting 113 which encloses the valve operating spring 137 by reason of the drain conduit 147, this conduit then extending forwardly to the main body of the transmission where the oil is permitted to drain back to the reservoir 124. A further conduit 148 is adapted to return the oil from operating cylinder 116 back to the reservoir, this conduit 148 opening rearwardly to the forward end of valve 121.

The valve 121 has the reduced valving portion 149 adapted to place the conduits 122 and 119 in communication when the valve is in its forward position under the influence of spring 137. In the drawings, the parts are shown in their positions for operating the low speed controlling device 32, the valve 121 being positioned forwardly so that the fluid pressure is just being delivered from the supply conduit 122 to the conduit 119 and the pressure chamber 116 of the cylinder 112. When the valve 121 moves rearwardly under the influence of solenoid 142, as will be presently more apparent, the spring 137 will be compressed and the reduced portion 149 will no longer provide communication between conduits 122 and 119 to supply fluid pressure from the pump H to operate the piston 111 and selector rack shaft D forwardly for actuating one of the speed ratio controlling devices 32, 33, 34 or 35, depending on the rotative selective adjustment of the selector rack shaft, as will be presently more apparent.

The function and operation of the manually controlled selector mechanism E in relation to the selector rack shaft D will now be further described.

Secured to the upper end of the hollow operating shaft 96, as best seen in Fig. 4, is an annular collar 150 having an integral laterally extending projection 151 providing an abutment for a spring 152 which has its lower end yieldingly acting against an intermediate portion of a manually operated selector element or lever 153. It will be noted that the extension 151 projects through an arcuate opening 154 of the fixed housing 99 to accommodate oscillating adjustment of the extension 151.

The inner end of selector lever 153 is pivotally mounted at 155 to an intermediate portion of the collar extension 151 so that the selector lever may have vertical movement on pivots 155 relative to the extension 151 but when lever 153 is moved around the axis of the steering post housing 99, the collar 150 together with its extension 151 and the shaft 96 will be rotatively moved as a unit.

Fixed on the upper end of the housing 99 is a housing 156 preferably in the shape of a sector. The outer end of this housing has a downwardly extending flange 157 provided with an arcuate opening 158 through which the lever 153 extends for arcuate adjustment. The outer end of the selector lever is provided with a knob or handle 159 adapted for convenient grasp by the hand of the motor vehicle driver.

The outer curving edge of housing 156 is preferably formed with a number of legends characterizing the various positions of manual adjustment of selector lever 153 depending on the number of stations of adjustment for this lever. In the particular embodiment illustrated, the selector lever 153 is adapted to have five positions of adjustment 160, 161, 162, 163 and 164 bearing the legends indicated in Fig. 3 designating the lever positions corresponding to first, second, third, neutral and reverse conditions of control for the transmission.

The flange 157 of housing 156 carries an arcuately arranged switch mechanism below the selector lever 153, this mechanism being best illustrated in the wiring diagram of Fig. 13. This switch comprises an arcuate floor 165 provided with a series of grooves or notches 166, 167, 168, 169 and 170 corresponding respectively to the positions of selector lever 153 when adjusted to the stations 160 to 164, inclusive. The upper sides of the aforesaid notches are preferably chamfered or beveled, as shown in Fig. 13, and the portion of selector lever 153 engageable with these notches is likewise beveled as indicated at 171.

When the operator desires to select any condition of control of the transmission, he swings the selector lever 153 into the desired position, the spring 152 yieldingly urging the selector lever downwardly into engagement with one of the notches of the switch member 165.

Referring now to the wiring diagram of Fig. 12, a plurality of switches or contacts 172 for each of the notches of the switch member 165 are adapted for operation by a stem 173 slidable in an opening 174 communicating with each of the switch notches. When the selector arm is located in any of the switch notches, one of the stems 173 associated with such notch is engaged by the selector lever and is pushed downwardly by the spring 152 to break the current through the wire 175 which connects all the switches 172 in series. Each switch 172 has a spring 176 associated therewith for restoring the switch to its contacting position and raising its stem 173 as soon as the selector lever is moved out of one of the notches. The wire 175 connects with one terminal of a storage battery 177, the other end of the wire 175 being connected to the windings 178 of the solenoid armature 144 aforesaid, which is grounded at the other terminal of the battery 177.

The manually controlled selector operating mechanism is practically instantaneous in its response to selective adjustment of the lever 153 and the different selections may be made as rapidly as desired. In the general operation of the selector mechanism E for changing the transmission speed ratio, the operator moves the selector lever 153 from one of the station notches in the switch member 165. Just as soon as the selector lever is moved from one of the notches, the switch 172 associated with such notch will be closed, thereby inducing an electrical circuit through the solenoid windings 178 for causing the solenoid armature 144 to move rearwardly against the abutment 146. This rearward movement of the solenoid armature will adjust the valve 121 rearwardly to place the fluid pressure chamber 116 of cylinder 112 in communication with the reservoir discharge conduit 148 whereupon the spring F will move the shaft D rearwardly to release any of the controlling devices 32 to 35 which might have been in operation. This entire phase of the operation takes place very quickly during the initial part of adjustment of the selector lever out of one of the notches of the switch member 165. The selector lever 153 may then be moved into any other station of control and dropped into the corresponding notch for such position.

When the selector lever is so released it will be apparent that one of the switches 172 corresponding to such newly selected position will be opened, thereby interrupting the electrical circuit through the wire 175 to the solenoid windings 178. At such time the spring 137 will immediately act to move the valve 121 and the armature 144 forwardly to establish communication between the fluid pressure supply conduit 122 and the pressure chamber 116. This will immediately cause a forward movement induced by the fluid pressure on the shaft D for operating one of the selector controlling devices which might have been selected for the new position or else for operating the shaft D without causing any movement of any of the speed ratio controlling devices in the event that neutral was selected.

Returning now to the aforesaid cycle of operation and to the point where the selector lever 153 was described as having been moved out of one of the notches preparatory to movement thereof into a newly selected notch, just as soon as the solenoid armature 144 moves rearwardly to operate the valve 121 to vent the pressure chamber 116, it will be apparent that the fluid pressure load is removed from the shaft D which is now in its rearward position so that arcuate movement of the selector lever 153 will operate through the hollow steering post shaft 107, Bowden wire mechanism 112, and sector 87 to rotatably adjust the shaft D into a new position for actuation of one of the speed ratio controlling devices. The mechanism operates almost instantaneously so that there is practically no resistance to immediate arcuate adjust of selector lever 153 from a position in one of the notches although any binding tendency experienced at the shaft D during the initial or other tendency to move the shaft will be taken up yieldingly through the Bowden wire connection shown in Fig. 5A.

Referring now to the details of the pump H and our pressure regulating means, the pump assembly includes a casing structure 179 fixed to the transmission structure as illustrated in Figs. 1 and 11. The casing 179 receives the pump drive shaft 125 aforesaid which is suitably journaled at 180 and 181 by the casing.

As illustrated the gear 126 on the shaft 125 is in constant mesh with the idler gear 127 which in turn is drivingly connected with the fluid-impeller-associated driving pinion 128. A ported cylindrical member 182 is suitably fixed to the casing 179, the member 182 having inlet and outlet passages 183 and 184 respectively for the fluid, such as oil, admitted to the pump H and delivered therefrom under pressure. The inlet 183 is in suitable communication with the fluid in the reservoir 124.

Tightly pressed into a cylindrical opening 185 of the ported member 182 is a cylindrical port seat body or ring 186 journaling the adjacent end of the shaft 125, this body having inlet and outlet passages 187 and 188 communicating radially at one end with the passages 183 and 184 respectively. The other ends of the passages 187 and 188 form the well known circumferentially spaced arcuate inlet and outlet ports respectively for communication with the inlet and outlet ports of the pumping cylinders as will presently be apparent.

A pump rotor 189 is drivingly connected to the shaft 125, and carries a plurality of circumferentially spaced cylinders 190 opening inwardly toward a wabble or swash-plate 191, a cylinder head portion 192 of the rotor having a port 193 for each cylinder.

A piston 194 is adapted to reciprocate within each cylinder 190 and is urged inwardly by a spring 195 into contact with the swash-plate 191, the inner rounded end of each piston yieldingly engaging an outer ring 196 of the swash-plate. This ring is supported by a bearing 197 carried by a swinging arm 198 pivotally supported at 199 from the casing 179. The swash-plate 191 carries an extension 200 which is adapted to be controlled by a pressure piston 201 in its swinging movement about the support 199 for levelling-off the plate 191 and minimizing or eliminating reciprocation of the pistons 194. The fluid under pressure is led to a suitable point of usage from the pump outlet passage 184 through a passage 202 in communication with the conduit 123.

As the shaft 125 drives the rotor 189, with plate 191 in its Fig. 11 position for maximum stroke of the pistons 194, approximately half the pistons 194 are moving inwardly drawing in oil through their inlet port and ports 193 associated therewith, while the remaining pistons are discharging oil under pressure through their associated ports 193 and outlet port for conveyance through the passage 202 in the well-known manner.

When the pump H is initially operated, the pressure of the oil delivered through the passage 202 at the same time communicates through a lead-off passage 202ª with a cylinder 203 of a pressure casing 204 within which the piston 201 with a suitable sealing member 205, attached thereto by a fastener 206, is adapted to provide a fluid pressure space 207. The casing 204 is suitably fixed to the pump casing 179 as by fasteners 208 which preferably are also adapted to hold a sealing member 209 that provides a second fluid pressure space 210 which is supplied fluid pressure to a predetermined amount through a conduit 211 under certain conditions as will hereinafter be more apparent. The conduit 211 is so positioned that the piston 201 in its movement forwardly to level off the plate 191 will not uncover the conduit 211 to the pressure space 207.

The effective area of the piston 201 in sealing the pressure space 207 is such that when a predetermined fluid pressure is substantially built up in the passage 202, providing no fluid pressure has been introduced into the pressure space 210 through the conduit 211, the piston will move forwardly to progressively level off the plate 191 until the pistons 194 are substantially motionless so far as reciprocation is concerned, assuming of course that oil under pressure is not being relieved from the delivery system. Any minor leakages which might be present in the delivery system will require only a small movement of the pistons to maintain the maximum desired oil pressure in the passage 202.

To automatically control the fluid pressure of the pump H in response to the selection of the various speed ratio controlling devices, we prefer to use a rack actuated valve 212 which is illustrated as adapted to provide a predetermined fluid pressure to actuate the first and reverse speed ratio controlling devices 32 and 35 respectively, but we desire to point out that similar controlling means may be provided for the other speed ratio controlling devices without departing from the scope of our invention.

The valve 212 is adapted to reciprocate within a cylinder 213 of a projection or extension 214 of the casing 81ª at right angles to the rack D, a suitable resilient means such as a spring 215 suitably housed within the cylinder 213 urging the valve against the rack. An elongated cam surface 216 (best shown in Fig. 13) is formed on the rack D and is continuously adapted while the rack is in its reverse or illustrated first speed positions to place in communication through a valve portion 217 of the valve 212 a pressure conduit 218, branching off the passage 202ª, and the delivery conduit 211 leading to the pressure space 210. Upon the rack D being rotated beyond its reverse, neutral, and first speed positions the valve 212 is urged by the spring 215 to move against a normal portion 219 of the rack to close the pressure conduit 218 and to place the conduit 211 in communication with a relief passage 220 open to the oil reservoir 124.

With the valve 212 in its illustrated position of Fig. 6 the fluid pressure from the passage 202 is admitted into the conduit 211 communicating with the second fluid pressure space 210. The area of the piston seal 205 is sufficient to effect through the pressure within the pressure space 207, providing there is only atmospheric pressure within the space 210, a leveling off of the swash-plate 191 at a predetermined fluid pressure delivered by the pump H through passage 202. The cross-sectional area of the piston 201 is sufficient to effect, through the fluid pressure admitted into the space 210 to oppose the fluid pressure in the space 207 tending to move the piston 201 forwardly to level off the swash-plate, a leveling-off of the swash-plate at another predetermined fluid pressure delivered by the pump which is preferably higher than the pressure at which the plate 191 levels off when the valve 212 is in its other position against the normal portion 219 of the rack D. We have found it desirable to use a higher fluid pressure to actuate the first and reverse speed ratio controlling devices 32 and 35 respectively to hold satisfactorily the drums 37 inasmuch as higher torque is transmitted by these speed ratios than by the other speed ratios. However, we wish to point out that means similar to the valve 212 may be used to control the operating fluid pressure for actuating any of the other controlling devices 33 and 34 without departing from the scope of our invention.

The position of the rack D, as determined by the condition of the selector handle 153, thereby controls through the cam surface 216 the position of the valve 212 to effect a predetermined high fluid pressure level-off of the pump H for the reverse and first speed ratios, and a predetermined low fluid pressure level-off of the pump for the second and direct speed ratios. Upon selection of the second or direct speed ratios by the vehicle driver the rack D is rotated in response to movement of the selector lever 153 to place the rack normal portion 219 adjacent the valve 212 to cause a closing of the conduit 218 and an opening of the passage 220 to relieve the fluid pressure in the space 210.

The face of the cam surface 216 can be made continuous between its reverse speed ratio position and its illustrated first speed ratio position inasmuch as none of the controlling devices 32 to 35 are actuated when the selector lever 153 is in its neutral station 169 interposed between the first and reverse speed stations 160 and 164 respectively.

One feature of our invention resides in the simple control that is possible with our novel transmission system, one preferred embodiment of this control being illustrated in Fig. 2 wherein it will be observed that the selector lever 153 is positioned for manipulation laterally to the right of the steering wheel 108 for effecting a change in the condition of the transmission. Our transmission provides for convenient manipulation of the motor vehicle by providing the engine throttle control or accelerator pedal 221 preferably at the right hand side of the steering post 99 so that it may be manipulated by the right foot of the driver. On the same side of the steering post is a pedal 222 which is adapted to operate the wheel brakes of the motor vehicle. Our illustrated transmission is wholly responsive to the various positionings of the selector lever 153 by the vehicle driver, and our fluid pressure regulating means is selectively controlled thereby without requiring additional controls or adjustments by the driver.

In the operation of the illustrated transmission the vehicle driver merely manipulates the selector lever 153 to obtain the desired speed ratio with the desired engagement characteristics of the speed ratio controlling device for the selected speed ratio. The selector operating mechanism is practically instantaneous in its response to selective adjustment of the lever 153 and the different selections may be made as rapidly as desired.

When the operator moves the selector lever 153 from one of the station notches in the switch member 165, the switch 172 associated with such notch will be closed—thereby inducing an electrical circuit through the wire 175 to the solenoid windings 178 for moving the solenoid armature 144 rearwardly. This rearward movement of the solenoid armature will adjust the valve 121 rearwardly to place the fluid pressure chamber 116 of cylinder 112 in communication with the reservoir discharge conduit 148 whereupon the spring F will move the shaft D rearwardly to release any of the controlling devices 32 to 35 which might have been in operation. The selector lever 153 may then be moved into any other station of control and dropped into the corresponding notch for such position.

When the selector lever is so released, it will be apparent that one of the switches 172 corresponding to such newly selected position will be opened—thereby interrupting the electrical circuit through the wire 175 to the solenoid windings 178. At such time the spring 137 will immediately act to move the valve 121 and armature 144 forwardly to establish communication between the fluid pressure supply conduit 122 and the pressure chamber 116. This will immediately cause a forward movement induced by the fluid pressure on the shaft D for operating one of the selector controlling devices 32 to 35 which might have been selected for the new position or else for operating shaft D without causing any movement of any of the speed ratio controlling devices in the event that neutral was selected.

Upon moving the selector lever to a position adjacent the first or the reverse speed stations 160 and 165 respectively, the rack D is rotated in the earlier described manner to engage the gear 77 with the rack 82 for effecting first speed or to engage the gear 77a with the rack 83 for effecting reverse speed. During this interval the cam surface 216 is simultaneously rotated to hold the valve 212 in its first and reverse speed position at which time the relief passage 220 is closed and the fluid pressure from the pump H communicates through the conduits 211 and 218 with the space 210 to oppose the pressure in space 207 tending to level off the swash-plate 191. This introduction of fluid pressure to the space 210 makes it necessary for the pistons 194 of the pump to reciprocate until additional fluid pressure is created and led to the space 207 sufficient to overcome the fluid pressure in the space 210 and level off the swash-plate. The pump H is practically instantaneous in its response to this movement of the valve 212 and rapidly builds a predetermined fluid pressure before levelling off.

As soon as the selector lever is dropped into the corresponding notch for the newly selected position, which may be as soon as desired, one of the switches 172 corresponding to such newly selected position will be opened, as described earlier to cause a forward movement of the rack induced by the fluid pressure in the chamber 116. It is obviously evident that the fluid pressure in the chamber 116 is increased to a predetermined amount before the pump is levelled off, and thereby the selected controlling device 32 or 35 is actuated to hold the drum 37 against undesirable slippage.

When the vehicle operator desires to drive the vehicle in the second or direct speeds of the illustrated transmission he adjusts the selector lever 153 to a position adjacent the second or the direct speed stations 161 and 162 respectively, the rack D is rotated in the earlier described manner to engage the gear 77ᵇ with the rack 84 for effecting second speed or to actuate the direct drive clutch 34 for effecting the direct drive. During this interval the cam surface 216 is simultaneously rotated to allow the spring 215 to urge the valve 212 into its second speed and direct drive position against the normal portion 219 of the rack.

During the movement of the valve 212 by the spring 215 the conduit 218 is closed as the relief passage 220 is opened to the conduit 211 so that the space 210 is vented to relieve the pressure accumulated therein when the selector lever 153 has been opposite the neutral, first or reverse stations 163, 160 and 164 respectively prior to the newly selected position thereof. When the valve 212 is against the rack normal portion 219 the fluid pressure from the pump H communicates through the passages 202 and 202ᵃ with the space 207 to level off the plate 191 when a predetermined fluid pressure is provided by the pump with which to actuate the second or the third speed ratio controlling devices 33 and 34.

Upon dropping the selector lever into the corresponding notch 167 or 168 for the newly selected position, one of the switches 172 corresponding to such newly selected position, one of the switches 172 corresponding to such newly selected position will be opened, as described earlier, to cause a forward movement of the rack induced by the fluid pressure in the chamber 116. The maximum fluid pressure thereby provided in the chamber 116 is sufficient to cause the pump to level off at a predetermined fluid pressure adequate to actuate the selected controlling device 33 or 34 sufficiently to hold the drum 37 against undesirable slippage.

These adjustments of the selector lever 153 to the various stations 160 to 164 may be made as rapidly as desired and in any sequence. The pump H is practically instantaneous in varying the fluid pressure to supply the operating requirements of the transmission and to supply the increased fluid pressure required by the low and reverse speed ratio controlling devices 32 and 35 respectively to accommodate the comparatively higher torque transmitted by these speed ratios.

Our fluid pressure regulating means provides, in response to the selection of a speed ratio, the degree of engagement of the selected transmission speed ratio controlling device necessary to control the torque transmitted by the selected speed ratio gear train. As a result of the function of our regulating means the various speed ratio controlling devices 32 to 35 are actuated sufficiently to control the torque transmitted by the selected speed ratio gear train, which control of the fluid pressure delivered by the pump H effects better operating characteristics than does the use of a uniform fluid pressure for actuating any of these controlling devices. Furthermore, the use of the desired fluid pressures for operating the controlling devices reduces the wear on the bearing surfaces of the pump inasmuch as the pump operates only to furnish a predetermined fluid pressure for each speed ratio. The fluid pressure required to satisfactorily actuate the second and third speed ratio controlling devices 33 and 34 respectively is lower than that required for the other speed ratios, and inasmuch as the vehicle driver ordinarily operates his vehicle in second and third speeds for long periods, the pump H has a comparatively low fluid pressure to maintain.

Referring now to the modified embodiment illustrated in Figs. 14 to 17, our pump pressure regulating means is illustrated with a pressure system for a power transmitting device of the same general character as that of the earlier described embodiment except that the pressure medium is selectively admitted to individual pressure cylinders for actuating the operating means of each speed ratio controlling device. Parts of similar function but different construction have been indicated by primed "W" reference characters.

The illustrated vehicle drive includes the prime mover or engine A, the fluid coupling clutch Bʷ driven from the engine, and the change speed transmission Cʷ driven from the clutch B. During the operation of the transmission Cʷ the drive passes from the transmission through the power take-off shaft 20ʷ.

It will be noted that the change speed transmission Cʷ is of the epicyclic or planetary type. As usual, this transmission includes the transmission speed ratio controlling devices 32ʷ, 33ʷ, 34ʷ and 35ʷ, these controlling devices being respectively adapted to actuate the transmission in its first speed ratio or low gear, second speed ratio or intermediate gear, third speed ratio or direct drive, and reverse drive.

The controlling devices 32ʷ to 35ʷ are adapted to act on transmission elements associated therewith and usually embodied in the form of a rotary drum like the drum 37, which is illustrated in Fig. 15 in association with the transmission controlling device 32ʷ for the first speed. Inasmuch as the form and arrangement of these planetary gear trains are well known in the art, the details are omitted from this disclosure.

The speed ratio controlling devices 32ʷ to 35ʷ are, for the most part, similar in construction and operation and the following description of the details of the controlling device 32ʷ illustrated in Fig. 15 is typical of the other brakes. In Fig. 15 the drum 37 is normally rotated by the planetary gearing 41 associated therewith when the transmission Cʷ is not in its first speed driving condition, and when rotation of the drum 37 is prevented by the braking mechanism associated therewith, then the drive through the transmission takes place for the first speed gear ratio according to the well known practice for planetary gearings of the general type illustrated.

To brake the drum 37, the band 36ʷ around the drum provides ends 223 and 224 normally separated by a spring 225. The band 36ʷ is provided with the brake lining 38ʷ adapted to contact with the drum when the ends 223 and 224 of the brake band are forced toward each other to contract the band. The band 36ʷ is anchored in any suitable manner (not illustrated) and a suitable brake actuating mechanism is provided for each of the bands such as the actuating mechanism illustrated in Fig. 15.

With each of the controlling devices 32ʷ to 35ʷ is associated a cylinder. One of these cylinders is illustrated at 226 in Fig. 15 in association with the controlling device 32w. This cylinder receives a pair of opposed pistons 227 and 228, the pistons being operably connected to actuate the respective band ends 223 and 224 by suitable links 229 pivoally supported at 230. The cylinder 226 has a fluid pressure inlet 231 adapted to admit fluid under pressure to the space between the pistons 227 and 228 in order to actuate these pistons away from each other as shown in Fig. 15 in contracting the brake band to arrest rotation of the associated controlling drum 37. Upon release of the fluid pressure, the spring 225 will act to space the brake band 36w from the drum 37, pistons 227 and 228 being also restored and the fluid pressure being displaced from the cylinder 226 by way of the opening 231.

In order to selectively control the supply of fluid under pressure to the actuating mechanism of each of the various speed ratio controlling devices provision has been made for a fluid pressure control and distributing system, illustrated in somewhat diagrammatic form in Fig. 14.

The pump Hw is suitably located to draw the fluid from the reservoir 124w through the passage 183w, the fluid under pressure being discharged from the pump through the high pressure passage 184w leading to a valve casing 232 of the selective controlling means herein illustrated in the form of rotary distributing valve means J.

A valve 233 of the valve means J cooperates with the casing 232 to provide a fluid pressure supply space or chamber 234 and a low pressure space or chamber 235. The supply chamber 234 delivers oil under pressure from the high pressure passage 184w, through a passage 236 extending through the valve to a distributing outlet 237 illustrated in Fig. 14 as registering with a conduit 238, the outlet being also adapted for selective alignment with further conduits 239, 240 and 241. The casing 232 has an uninterrupted portion 242 intermediate the conduits 238 and 241 so that when the outlet 237 is adjusted to a position opposite the portion 242, the fluid in the passage 236 will not escape, this position being the neutral setting of the valve 233.

The low pressure chamber 235 is continuously open to a conduit 243 which is arranged below the plane of oscillatory movement of the outlet 237, the conduit 243 communicating with the reservoir 124w. During movement of the valve 233, the high pressure chamber 234 is continuously in communication with the oil pressure delivery passage 236, and the low pressure chamber 235 is continuously in communication with the return 243.

The distributing valve means J is adapted to be manually adjusted by the vehicle driver. The stationary selector segment 156w is conveniently mounted on the steering post 99w, the segment having a plurality of notches for advising the operator of the setting of the hand-operated selector lever 153w pivotally mounted at 244 in association with the segment 156w. The selector lever 153w has a certain amount of resilience so that when moved by the vehicle driver the lever may be sprung for selective engagement with the various notches of the segment 156w. Thus, the segment 156w has the notches 166w, 167w, 168w, 169w and 170w respectively adapted, when engaged with the selector arm 153w, to manipulate the transmission Cw (within certain limitations and conditions which will hereinafter be more apparent) into first speed, second speed, direct drive, neutral and reverse drive. The valve 233 is adapted for actuation by the selector lever 153w through a Bowden wire 245 which is connected at 246 to a lever 247 which is securely fixed to the valve 233 at the axis of oscillation of the valve.

The pump Hw is preferably of the well known swash plate variety and is driven from its location in the oil storing reservoir 124w of a transmission casing 248 by a vertical shaft 249 having a gear driven by the gear 128w fixed to the driving sleeve 29w of the driving vane member 21w. The shaft 249 enters the pump casing 179w to actuate the pump in a well known manner whereby the fluid is received through the passage 183w and discharged under pressure through the passage 184w by the reciprocating pistons 194w.

The pistons 194w are controlled by the swash plate 191w, against the upper surface of which the pistons bear as they are rotated. The swash plate is pivotally supported at 199w on the casing 248 and the portion of the plate in contact with the pistons 194w is illustrated in Fig. 16 as inclined with respect to the horizontal.

As the movable parts of the pump Hw are rotated by the shaft 249, with the plate 191w positioned as in Fig. 16 for maximum stroke, approximately half of the pistons 194w are moving inwardly to draw in fluid in the well known manner of pumps of this type illustrated in the aforegoing embodiment, while the remaining pistons are discharging fluid under pressure for passage through the passage 184w.

An extension 250 of the swash plate 191w is normally acted upon by a piston 251 adapted to reciprocate within a cylinder 252 of a projection 253 of the casing 248 in response to variations in fluid pressure within the cylinder. Fluid pressure is introduced into the cylinder 252 by a lead-off conduit 254 communicating with the passage 184w.

By properly positioning the piston 251 with regard to the normal distance between the swash plate support 199w and the line of action of the piston 251, and by using the proper effective area of the piston 251 subject to the fluid pressure, the pump Hw will level off or become ineffective when a predetermined fluid pressure is provided in the passage 184w.

As the fluid pressure reaches the desired maximum determined by the piston 251, the fluid pressure acts through the pistons 194w which are exposed to the passage 184w, to cause the swash plate 191w to swing about the pivotal support 199w toward a "level-off" position by gradually having the stroke of the pistons 194w reduced. When fully levelled off the pistons 194w will not reciprocate until the delivery pressure falls, at which time the force of the piston 251 against the swash plate is reduced to progressively increase the inclination of the swash plate.

To automatically control the fluid pressure delivered by the pump Hw in response to the selection of the various speed ratio controlling devices 32w to 35w a piston 255 is adapted to bear against the swash plate extension 250, in opposition to the action of the piston 251, to effect a condition in the fluid pressure system wherein the pump provides a predetermined fluid pressure to actuate the reverse speed ratio controlling device 35w. We desire to point out that similar controlling means may be provided for the other speed ratio controlling devices without departing from the scope of our invention.

The piston 255 is adapted to reciprocate within a cylinder 256 of an extension 257 of the casing 248 in response to fluid pressure within the cylinder. Fluid pressure is introduced into the cylinder 256 by a reverse drive lead-off conduit 258 (best shown in Figs. 14 and 17) communicating with the reverse speed ratio conduit 241.

By properly positioning the piston 255 with regard to the effective distance between the lines of action of it and the piston 251, and by using the proper effective area of the piston 255 subject to the fluid pressure, the swash plate of the pump will level off when a predetermined fluid pressure is provided in the passage 184w. This predetermined fluid pressure for actuating the reverse speed ratio controlling device 35w is preferably higher than that for actuating the other controlling devices 32w to 34w inasmuch as relatively higher torque is transmitted by the reverse gear train.

Upon selecting the reverse speed ratio drive of the transmission the valve 233 is rotated simultaneously to place the distributing outlet 237 in communication with the conduit 241. This movement of the valve 233 admits the fluid pressure from the fluid pressure chamber 234 into the conduit 241 to actuate the controlling device 35w and simultaneously introduces the fluid pressure into the lead-off conduit 258 to force the piston 255 against the swash plate 191w. The introduction of the fluid pressure to move the piston 255 makes it necessary for the pistons 194w of the pump to provide increased fluid pressure in the passage 184w and the cylinder 252 with which to cause the piston 251 to level off the swash plate against the opposing force of the piston 255 when the predetermined maximum fluid pressure for reverse speed has been effected.

With reference now to the operation of the illustrated power transmitting mechanism, let it be presumed that the parts are positioned in neutral with the selector arm 153w registering with the neutral notch 169w. At this time the distributor valve outlet 237 is positioned opposite the neutral space 242 of the valve casing 232 so that the fluid pressure is not being delivered to any of the speed ratio controlling devices 32w to 35w of the transmission. When the selector arm registers with the notches 166w, 167w, 168w or 169w the pistons 194w of the pump continue to reciprocate until the fluid pressure in the passage 184w reaches the predetermined maximum pressure for actuation of the devices 32w to 34w, at which time the piston 251 progressively levels off the swash plate 191w.

Now let it be presumed that the vehicle operator wishes to drive the vehicle in one of its forward speeds, such as first speed for example. The selector arm 153w is moved out of engagement with the neutral notch 169w and into the first speed notch 166w as illustrated.

Presuming now that the vehicle operator wishes to select a higher speed ratio from the illustrated first speed condition, he moves the selector arm 153w out of engagement with the first speed notch 166w and into the second speed notch 167w. The distributor valve outlet 237 is then positioned in communication with the second speed conduit 239, it being apparent that the first speed conduit 238 is opened to the low pressure chamber 235 and the spring 225 associated with the first speed controlling device 32w will move the pistons 227 and 228 toward each other, the fluid displaced thereby returning through the inlet 231 and thence to the reservoir 124w by reason of the return conduit 243. In the meantime, the fluid pressure being supplied to the second speed conduit 239 causes the second speed controlling device 33w to be energized to produce a drive in the second speed gear ratio.

In a similar manner the driver may then select third speed, if desired, by moving the selector arm 153w out of engagement with the second speed notch 167w and into the third speed notch 168w. Thereupon the distributor valve outlet 237 is moved adjacent the third speed conduit 240, the second speed conduit 239 being then placed in communication with the low pressure chamber 235. The fluid pressure being supplied in the meantime to the third speed conduit 240 causes the third speed controlling device 34w to be energized to produce a drive in the third speed or direct drive.

It is not necessary for the vehicle operator to shift the selector arm 153w into the notches 166w, 167w and 168w in this particular sequence to operate the vehicle in its forward speeds. In other words, he may, for example, move the selector arm 153w directly from the first speed notch 166w into the third speed notch 168w.

If it is desired to drive the vehicle in reverse, the operator moves the selector lever 153w into the reverse drive notch 170w much in same manner as for the earlier described selection of the forward speeds of the transmission. The distributor valve outlet 237 is thereupon moved to communicate with the reverse speed conduit 241 and the fluid pressure is simultaneously admitted into lead-off conduit 258.

The fluid pressure thus introduced into the reverse speed conduit 241 tends to energize the reverse drive controlling device 35w to produce the reverse drive. Almost instantaneously the fluid pressure in the conduit 258 causes the piston 255 to force the swash-plate 191w downwardly so that the pump pistons 194w must produce increased fluid pressure before the piston 251 will level off the swash-plate. This increased fluid pressure provided by the pistons 194w in response to the introduction of fluid pressure in the conduit 258 is practically instantaneous and the pump pistons continue to reciprocate to increase the fluid pressure in the pressure system until the aforesaid predetermined maximum fluid pressure for actuating the reverse drive controlling device 35w is effected. The increased fluid pressure thereby provided by the pump, after the original introduction of fluid pressure into the conduit 241, immediately further actuates the device 35w to satisfactorily completely control the torque transmitted by the reverse gear train.

The means provided for completely controlling the reverse drive controlling device 35w is practically instantaneous in its response to the registering of the selector arm 153w with the reverse drive notch 170w, and no other remote controls are necessary.

When the vehicle operator wishes to select one of the forward speeds or neutral from the aforesaid reverse drive condition, he swings the selector arm 153w out of engagement with the reverse notch 170w and into one of the notches 166w to 169w. The distributor valve outlet is simultaneously positioned in communication with one of the conduits 238 to 240, respectively. During this movement of the selector lever 153w the reverse speed conduit 243 is opened to the low pressure chamber 235 to return the displaced fluid through the reservoir return conduit 243 much in the same manner as described for the first speed condition.

While the displaced fluid is being returned through the conduit 243, the lead-off conduit 258 has its fluid pressure reduced also so that the piston 255 will no longer force the swash-plate 191ʷ downwardly. With the piston 251 not being opposed by the piston 255 the pistons 194ʷ will continue to reciprocate only until the fluid pressure in the passage 184ʷ is sufficient to cause the piston 251 to level off the swash-plate 191ʷ, at which time the fluid pressure within the pressure system is at its aforesaid predetermined maximum pressure for actuating the forward speed controlling devices 32ʷ to 34ʷ. This response of the pump to the reduction of pressure in the conduit 258 is practically instantaneous with this selection of one of the notches 166ʷ to 169ʷ.

Referring now to the modified embodiment illustrated in Fig. 18, an improved swash plate pump is made possible by our pump pressure regulating means. It will be understood that this modified arrangement is intended to be substituted for the corresponding parts previously described in Figs. 14 to 17, and the entire mechanism and the operation of the same will not again be duplicated. Parts of similar function but different construction have been indicated by primed "x" reference characters.

The swash plate 191ˣ is pivotally mounted at 259 near the central portion of the former. A yielding means such as a spring 260 may be interposed between the swash plate and a spring abutment member 261 to assist in returning the swash plate from its leveled off position. During the operation of the illustrated embodiment of Fig. 18 when the selector lever 153ʷ registers with one of the forward speed notches and the neutral space 166ʷ to 168ʷ and 169ʷ respectively, at which time the piston 255 does not oppose the piston 251, the pistons 194ʷ of the pump Hˣ continue to reciprocate until the fluid pressure in the passage 184ʷ is sufficient to cause the piston 251 to level off the swash plate. The location and rate of the spring 260, as well as the effective area of the piston 251 subjected to the fluid pressure developed by the pump, are such that when the swash plate levels off under these conditions the fluid pressure within the system is the aforesaid predetermined maximum fluid pressure for actuating the selected forward speed controlling device 32ʷ, 33ʷ or 34ʷ.

Upon movement of the selector lever 153ʷ to the reverse drive notch 170ʷ the developed fluid pressure in the system also communicates with the piston 255 to cause the piston to bear against the swash plate. With the piston 255 acting against the swash plate the pump pistons 194ʷ continue to reciprocate until sufficient fluid pressure is produced in the system to cause the piston 251 to level off the swash plate, at which time the fluid pressure within the system is at the aforesaid predetermined maximum fluid pressure for actuating completely the reverse drive controlling device 35ʷ.

The swash plate 191ˣ by reason of its centrally positioned pivotal support 259 effects through the pump pressure regulating means an improved control of the pump Hˣ. This swash plate will evenly control the pistons of the illustrated pump although relatively short-stroke pistons are used. It is possible with the swash plate 191ˣ to completely control the relatively short-stroke pistons 194ʷ whereas with the type of swash plate illustrated at 191ʷ in Fig. 17 the extended pistons must have a relatively long stroke to ride on the swash plate at all times until the swash plate is completely leveled off.

Less effort is required to level off the swash plate 191ˣ than the type illustrated at 191ʷ in Fig. 17 inasmuch as in the former about half of the pump pistons are tending to balance the plate, resulting in an easily controlled pump and a cushioning of the fluid therein.

With reference now to the modified embodiment in Fig. 19, a differential pressure piston is illustrated as being included in our pump pressure regulating means. It will be understood that this modified arrangement is intended to be substituted for the corresponding parts previously described in Figs. 14 to 17, and the entire mechanism and the operation of the same will not again be duplicated. We have indicated parts of similar function but different construction by primed "y" reference characters.

The reduced piston 251ʸ is adapted to reciprocate in a stationary cylinder 262 in order to control the inclination of the swash plate 191ʷ. A sealing member 263 is carried by the piston 251ʸ and forms a pressure chamber 264 with the closed end of the cylinder 262 which receives fluid pressure from the passages 184ʷ and 254ʸ. The open end of the cylinder 262 is closed by a stationary end member 265 which also seals the reduced piston 251ʸ to provide a reverse drive pressure chamber 266 communicating with the conduit 258ʸ.

In the operation of the Fig. 19 embodiment the point of action of the piston 251ʸ on the swash plate 191, and the effective area of the piston sealing member 263, are such that when the fluid pressure is not admitted into the reverse drive pressure chamber 266 the pump pistons will continue to reciprocate until sufficient fluid pressure is produced to force the piston 251ʸ to effect a levelling off of the swash plate. The fluid pressure within the pressure system when the swash plate is leveled off is the aforesaid predetermined maximum fluid pressure for actuating any of the forward speed controlling devices 32ʷ to 34ʷ.

If now the selector lever 153ʷ is registered with the reverse notch 170ʷ the fluid pressure is admitted to the conduits 241 and 258ʸ. The fluid under pressure in the conduit 258ʸ enters into the pressure chamber 266 to oppose the pressure on the piston sealing member 263 by the fluid in the pressure chamber 264 and the passage 254ʸ communicating with the passage 184ʷ.

The point of contact of the piston 251ʸ on the swash plate 191ʷ and the ratio of effective areas of both sides of the piston 263 are such that when fluid pressure is thus admitted to the chamber 266 the pump pistons 194ʷ will continue to reciprocate until sufficient fluid pressure is produced in the passages 184ʷ and 254ʸ to cause the piston 251ʸ to level off the swash plate. When the swash plate is so leveled off the pressure within the fluid pressure system will be aforesaid predetermined maximum fluid pressure for fully actuating the reverse drive controlling device 35.

Various modifications and changes may be effected in the illustrated application without departing from the spirit of the invention or from the scope of the appended claims.

What we claim is:

1. In a motor vehicle transmission having a plurality of speed ratio controlling devices, pressure fluid operated means including a common operating member for selectively operating said devices, manually operable means for controlling the selective operation of said operating member, means for supplying pressure fluid to said member, means including an element operable by the fluid pressure delivery of said supply means for controlling the pressure delivery of the latter, and means operable by said member in response to selective operation of the latter by said manually operable means for varying the fluid pressure operation of said element.

2. In a motor vehicle transmission having a plurality of speed ratio controlling devices, pressure fluid operated means for selectively operating said devices, means for controlling the selective operation of said pressure fluid operated means, means for supplying pressure fluid to said pressure operated means, mechanism responsive to the fluid pressure of said supply means for controlling the pressure of fluid delivered by the latter, and means operable by said pressure fluid operated means in response to selective operation of the latter for regulating the pressure responsive action of said mechanism.

3. In a motor vehicle transmission having a plurality of speed ratio controlling devices, fluid pressure operated means including a common operating member for selectively operating said devices, manually operable means for controlling the selective operation of said operating member, means responsive to operation of said manually operable means for controlling the supply of pressure fluid to said operating member, and means operable by said member in response to selective operation thereof by said manually operable means for regulating the pressure of fluid delivered by said supply means.

4. In a motor vehicle transmission having a a plurality of speed ratio controlling devices, pressure fluid operating means including a common operating member for selectively operating said devices, manually operable means for controlling the selective operation of said operating member, means for supplying pressure fluid to said member, and means operable by said member for regulating the pressure of the fluid delivered by said supply means in timed relation to the selective operation of one of said devices.

5. In a motor vehicle transmission having a plurality of speed ratio controlling devices, fluid pressure operated means for actuating said devices, manually operable means for causing selective operation of said devices, means including a pump for supplying fluid pressure for operation of said devices, a wobble plate structure for regulating the pressure of fluid delivered by said pump, means including an element responsive to pressure of fluid delivered by said pump for controlling said wobble plate structure, and means responsive to the operation of said manually operable means for causing the fluid pressure delivered by said pump to oppose the normal control of said wobble plate structure by said pressure responsive element in response to the selective operation of one of said devices.

6. In a motor vehicle transmission having a plurality of speed ratio controlling devices, fluid pressure operated means for actuating said devices, manually operable means for causing selective operation of said devices, means including a pump for supplying fluid pressure for operation of said devices, a wobble plate structure for regulating the pressure of fluid delivered by said pump, means including a member responsive to the pressure of fluid delivered by said pump for normally controlling said wobble plate structure, and a second pressure responsive member operable in response to operation of said manually operable means for varying the control of said wobble plate structure by said first member.

7. In a power transmitting mechanism including a plurality of selectively operable fluid pressure operated speed ratio controlling devices, a pump for supplying a fluid under operating pressure for operation of said devices, fluid pressure operated means operable to vary the pressure of fluid delivered by said pump, valve means operable to effect selective application of fluid pressure to said devices, manually operable means for effecting operation of said valve means, and means responsive to operation of said manually operable means for causing said fluid pressure operated means to vary the pressure of fluid delivered by said pump.

8. In a power transmitting mechanism including a plurality of selectively operable fluid pressure operated speed ratio controlling devices, a pump for supplying a fluid under operating pressure for operation of said devices, fluid pressure operated means operable to vary the pressure of fluid delivered by said pump, valve means operable to effect distribution of pressure fluid to said devices, means operable to effect operation of said valve means, and means responsive to operation of said means to effect operation of said valve means for causing said fluid pressure operated means to vary the pressure of fluid delivered by said pump.

9. In a power transmitting mechanism including a plurality of selectively operable fluid pressure operated speed ratio controlling devices, a pump for supplying a fluid under operating pressure for operation of said devices, valve means operable to effect distribution of pressure fluid to said devices, means controlling operation of said valve means, and means operable in response to operation of said control means for varying the fluid delivery output of said pump.

10. In a power transmitting mechanism including a plurality of selectively operable fluid pressure operated speed ratio controlling devices, a pump for supplying a fluid under operating pressure for operation of said devices, mechanism operable to vary the fluid delivery output of said pump, valve means operable to effect distribution of pressure fluid to said devices, means controlling operation of said valve means, and means operable in response to operation of said control means for causing said mechanism to vary the fluid delivery output of said pump.

11. In a motor vehicle power transmitting mechanism including a plurality of selectively operable fluid pressure operated speed ratio controlling devices, a pump for supplying a fluid under operating pressure for operation of said devices, valve means operable to effect distribution of pressure fluid to said devices, vehicle driver operated means operable to effect operation of said valve means, and means responsive to operation of said vehicle driver means for regulating the operation of said pump.

12. In a power transmitting mechanism including a plurality of selectively operable fluid pressure operated speed ratio controlling devices, means operable to control the selective operation of said devices, a pump for supplying a fluid under operating pressure for operation of said devices, a swingably mounted member for varying the fluid delivery output of said pump, a fluid pressure actuated element acting on said member for urging the latter in one direction of its swinging movement, a second fluid pressure actuated element acting on said member in opposition to said first mentioned element, and means operable in response to operation of said control means for controlling fluid pressure actuation of at least one of said elements.

13. In a power transmitting mechanism including a plurality of selectively operable fluid pressure operated speed ratio controlling devices, valve means operable to effect the selective operation of said devices, a pump for supplying a fluid under operating pressure for operation of said devices, a swingably mounted member for varying the fluid delivery output of said pump, a fluid pressure actuated element acting on said member for urging the latter in one direction of its swinging movement, and a second fluid pressure actuated element operable in response to operation of said valve means for acting on said member in opposition to said first mentioned element.

14. In a power transmitting mechanism including a plurality of selectively operable fluid pressure operated speed ratio controlling devices, at least one of said devices being operable to effect a reverse drive through said mechanism, valving means operable to effect distribution of pressure fluid to said devices, a pump for supplying a fluid under operating pressure for operation of said devices, a swingably mounted member operable to vary the fluid delivery output of said pump, a fluid pressure actuated element acting on said member for swinging the latter in one direction of its movement, and a second fluid pressure actuated element adapted to act on said member in opposition to said first mentioned element in response to operation of said valving means to effect operation of said reverse drive device.

15. In a motor vehicle power transmitting mechanism including a plurality of selectively operable fluid pressure operated speed ratio controlling devices constructed and arranged for operation at relatively differing predetermined pressures of fluid, a pump for supplying a fluid under operating pressure for operation of said devices, valve means operable to effect selective distribution of pressure fluid to said devices, driver manipulated means operable to effect operation of said valve means, and means operable in response to manipulation of said driver manipulated means to effect operation of said valve means for causing said pump to deliver a fluid pressure substantially corresponding to said predetermined operating pressure of the device to be selectively operated.

16. In a power transmitting mechanism including a plurality of selectively operable fluid pressure operated speed ratio controlling devices, a pump for supplying a fluid under operating pressure for operation of said devices, valve means operable to effect distribution of pressure fluid to said devices, means controlling operation of said valve means, and means operable in response to operation of said control means for varying the fluid displacement of said pump.

17. In a power transmitting mechanism including a plurality of selectively operable fluid pressure operated speed ratio controlling devices constructed and arranged for operation at relatively differing predetermined pressures of fluid, a pump for supplying a fluid under operating pressure for operation of said devices, valve means operable to effect distribution of pressure fluid to said devices for selective operation of the latter, means controlling operation of said valve means, and means operable in response to operation of said control means in operatively selecting one of said devices for causing said pump to deliver a fluid pressure substantially corresponding to said predetermined operating fluid pressure of the device selected.

HERBERT F. PATTERSON.
AUGUSTIN J. SYROVY.